(12) United States Patent
Sudhi

(10) Patent No.: US 7,558,737 B2
(45) Date of Patent: Jul. 7, 2009

(54) ENTITY VALIDATION FRAMEWORK

(75) Inventor: Suraj Sudhi, Bangalore (IN)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/307,910

(22) Filed: Feb. 28, 2006

(65) Prior Publication Data

US 2007/0203851 A1     Aug. 30, 2007

(51) Int. Cl.
*G06Q 99/00* (2006.01)
(52) U.S. Cl. .......................... 705/1; 709/201
(58) Field of Classification Search ............. 705/50–79, 705/38, 35
See application file for complete search history.

(56) References Cited

U.S. PATENT DOCUMENTS

| | | | |
|---|---|---|---|
| 7,004,382 B2 * | 2/2006 | Sandru | 235/379 |
| 7,353,227 B2 * | 4/2008 | Wu | 707/8 |
| 7,487,213 B2 * | 2/2009 | Zager et al. | 709/206 |
| 2001/0029482 A1 * | 10/2001 | Tealdi et al. | 705/38 |
| 2002/0091550 A1 * | 7/2002 | White et al. | 705/4 |
| 2003/0125973 A1 * | 7/2003 | Mathews et al. | 705/1 |
| 2003/0163783 A1 * | 8/2003 | Chikirivao et al. | 715/513 |
| 2004/0128262 A1 * | 7/2004 | Nafousi | 705/400 |
| 2006/0020570 A1 * | 1/2006 | Wu | 707/1 |

OTHER PUBLICATIONS

Muller, "Desktop Encyclopedia of the Internet", 1999, Artech House Inc., Norwood, MA, all pages.*
Gralla, "How the Internet Works", Millennium Edition, 1999, Que Corporation, Indianapolis, IN, all pages.*
White, "How Computers Work", Millennium Edition, 1999, Que Corporation, Indianapolis, IN, all pages.*
Derfler, "How Networks Work", Bestseller Edition, 1996, Ziff-Davis Press, Emeryville, CA, all pages.*

* cited by examiner

*Primary Examiner*—Andrew J. Fischer
*Assistant Examiner*—Jacob C Coppola
(74) *Attorney, Agent, or Firm*—Kenyon & Kenyon LLP (57) ABSTRACT

A method is provided for validating one entity, say a business or job applicant, for another entity (the requesting entity), say another business, that includes the steps of, classifying the entity type to be validated based on one or more predefined classifiers of an entity, applying one or more validation rules based on the classification for the entity type to produce a validation request, providing a validation request to one or more validation entities that perform at least a portion of the validation in accordance with the validation rules, and providing a validation outcome to the requesting entity that allows the requesting entity to assess the business or job applicant based on the validation rules and the source of the validation outcomes. Such a system and framework allows businesses to perform checks in a more structured and efficient way and allows for the sharing of validation outcomes amongst like entities.

24 Claims, 14 Drawing Sheets

Validator's Work List

| First Name | Last Name | Company | Send_Date | Resource | Grid | Applied | Candidate ID |
|---|---|---|---|---|---|---|---|
| SURAJ | SUDHI | SAP Labs India | 12/6/2004 | SURAJDOC | QT | 00000004 | 00000004 |
| KANATH | ASHWIN | SAP Labs India | 12/8/2004 | ASHWINDOC | QT | 00000005 | 00000005 |
| | | | | | | | |
| | | | | | | | |

1 of 2

Points to be Validated
Candidate is 00000005

Submit

| Old | Question | Question_Type | Response |
|---|---|---|---|
| 00000001 | DOES THE CANDIDATE HAVE VALID CERTIFICATION AS MENTIONED IN RESUME DURING PERIOD MAY 2003 - SEPT 2003? | Y:N | N |
| 00000002 | HAS THE CANDIDATE WORKED ON PROJECT MENTIONED IN THE RESUME DURING SEPT '03 - JAN '04 | Y:N | N |
| 00000002 | WHAT ARE THE COMMENTS FROM THE REFREES PROVIDED IN RESUME? | TEXT | |
| | | | |
| | | | |

1 of 3

Kindly enter Y for success validations and N for partial of false info.

ENTITY VALIDATION FRAMEWORK

FIELD OF THE INVENTION

This invention relates to validation of entities involved in commercial and personal dealings and in particular to a framework that automatically facilitates the validation process.

BACKGROUND OF THE INVENTION

Businesses of all sizes need to interact with other businesses and people all the time and it is a constant challenge for them to properly assess the wherewithal and bona fides of those with whom they need to deal with. This can be particularly important when the parties first need to interact, as it can make the difference between a successful interaction, a missed opportunity or a failure to even get past the first base.

This problem is known and dealt with in the best way the parties can which varies in complexity and cost depending largely on the size of the business and the type of interaction and where it is likely to head. Adding a further layer of complexity is the growing need to perform due diligence in all dealings particularly in large publicly listed companies which more than other forms of business require that there be systems and procedures for legal and good business practice.

By way of example only a small business relies on the experience of the owner/manager who has contacts they can rely on for independent advice, they have their own ways of making assessments of character and have formed views on the reputation of various parties. They can make enquiries with third parties such as credit providers, business advisors in the particular trade and credit rating agencies. However, in such circumstances generally their experience tells them when the investigation has gone far enough and what parties they can interact with to each other's mutual benefit.

By way of example only large businesses have separate departments to deal with new contacts or protocols for each department to follow when a new interaction or even a party that has recent interactions with the same or other departments of the same company makes contact to do business with the company.

The main aim of a large business is to ensure that any new party that wishes to interact with them meets a range of criteria that will vary depending on the type of interaction required. For example if the new party is a job applicant there will be a collection of information that needs to be verified, such as last employer, educational qualifications, etc. If the new party is to be a supplier of goods, then there will also be a collection of information which again needs to be verified and may include the testing of goods and a history check to determine the reliability of the supplier to other companies, etc.

It will be apparent that for every type of interaction and possible future expansion of the types of interaction the verification step is common. However, it is also apparent that the verification step is infinitely varied and requires multiple skills and contacts that cannot always be performed by just one individual even when they are following documented protocols.

The time and even the uncertainty of the reliability of the information provided can make the overall process of limited value to the business let alone satisfy legal requirements upon that the two parties may need to rely on in the future.

SUMMARY OF THE INVENTION

A method for validating one requesting entity for another entity including the steps of classifying the entity type to be validated based on one or more predefined classifiers of an entity; applying one or more validation rules based on the classification for the entity type to produce a validation request; providing a validation request of one or more validation entities to perform at least a portion of the validation in accordance with the validation rules; and providing a validation outcome to the requesting entity. The method wherein one or more of the entities performing a validation are not the requesting entity.

A system for validating one entity for another including a classifying element for classifying the entity type to be validated based on one or more predefined classifiers of an entity; a rule element for applying one or more validation rules based on the classification for the entity type to produce a validation request; a validation report element for providing a validation request, and one or more validation entities that receive a validation report and perform at least a portion of the validation in accordance with the validation rules and provide a validation outcome to the requesting entity using the validation entity that received the validation request.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

DETAILED DESCRIPTION OF THE INVENTION

A constant challenge faced by business and personal entities, including corporations is to ascertain the credentials of the many different entities they interact with namely but not exclusively, customers, partners, job applicants, vendors and so on. With increasing emphasis on security and authenticity in transactions between entities even at the job assessment level, it is only a matter of time before predetermined validation steps for different entity interactions becomes a legal imperative and then possibly binding on each of the entities. What is described herein is a framework that uses software to facilitate an entity to create a validation request and have one or more entities one of which may be itself to perform validations on the request and provide one or more validation outcomes. The outcome may be a confirmation of the request, a negative assessment based on the request or some level between these two extremes of an outcome.

There are one or more entity types, the entity type being based on one or more classifiers. There are one or more validation rules that are in turn based on the entity type. The combination of entity type and validation rule/s becomes a validation request. Thereafter the validation request is sent to one or more entities to perform the validation or at least a portion of the validation in accordance with the validation rules.

The software can also be used to allow the requesting entity to modify or add entities as well as modify or add validation rules. Moreover the software works within a framework can be integrated with other software used by the entity or by others thereby adding to the functionality and usefulness of existing software.

The entity validation framework uses but not exclusively entities, validation rules and validation entities as described below:

Entities

An entity type can be, for example but not limited to, any entity which is to be validated on behalf of a requesting entity. An entity type can be a customer entity, vendor entity, applicant entity and so on. The requesting entity using the software and framework can create new entities if there is no predetermined entity type but as will be described there will need to be additional aspects of the software created so that the rest of the validation process can be performed on the new entity.

Classification of the entity type can be by means of matching supplied information to predefined data formats (e.g. E1000 'E' refers to employees), query from specific fields of host tables and so on. The process of matching can be aided by using predefined fields and formats but that is not always necessary and there exist data matching programs to assist if that is not the case, or alternatively the person in the entity using the software can assist to match the received information. However, the program will hold the final classification of the entity type.

Validation Rules

This refers to the different rules for validating an entity. Validation can be in the form of questions, or can be based on filter values (create a validation request for all candidates based in a particular city, say New York) and other mechanisms that can be predefined by the software or created by the user entity. The user when creating the validation request chooses the validation criteria from defined criteria that can include selection rules and finally associates the validation rules to the entity requested to be validated.

Validation Entities

This refers to entities that perform the actual validation. The validation can be performed by third party validation agencies, a central validation repository, global validation repository and peer systems involving departments of the same entity making the validation request. The framework allows the requesting entity to define the mode of communication with the one or more validation entities, the validation time frame, priority of validation and so on.

The mode of communication can be through for example but not limited to eXtended Mark-up Language (XML) or IDocs. Once the validation entity is defined by the requesting identity or the type of request can automatically determine the entities to validate the request, the association between the entity, validation rules and validation entities is made and the framework can start the process of validation.

A Brief Description of Different Validation Entities is Given Below:

Third Party Validation Agencies

These are third party agencies that perform validations on the entity request based on the requesting entity's requirements. The framework provides a mechanism to integrate with a third party request receipt system by means of XML or IDoc. Once the validation is done, the required data in the form of a validation outcome is passed back to the requesting identity through the framework. The framework reads and processes the results of the validation based on the validation rules and business entity rules defined by the requesting identity.

Central Validation Repository

This is a central agency or central process that updates the information relating to validation within a corpus of companies or between different units of the same company. At the very least the central validation repository can be considered as a database where the validation outcomes are stored and accessible to predetermined entities, such as for example but not restricted to, different units of the same company or specified other entities willing to rely on the outcomes of other requests. The latter being the basis of sharing of information but which would need to be very controlled and managed to ensure issues such as currency of information, veracity of the outcomes and the requests that prompted the outcome and records of the entities used to perform the validation.

Workflows can be linked to the entity based on the validation outcome and additional system events can be defined. Thus for example if a candidate for a position fails the validation, a workflow can be initiated to inform recruitment that the validation has failed and action triggered to update the candidate record.

Once the validation results of an entity is stored, then other companies or units of a company can access this validation repository to validate the entity themselves. For example if an entity validates the credentials of a job candidate who applied for a job, it can place the details of the validation and its outcome in a centrally accessible validation repository. Another unit of the same entity, can now access this validation repository to determine the credentials of the candidate when they apply again to this entity even at another unit of the same entity.

Global Validation Repository—This refers to a global agency or process that collects information relating to an entity from diverse sources and then consolidates the data and provides the data to entity requesting it for a validation process. For example a global validation repository would contain data relating to a potential job candidate from different sources for example but not limited to educational institutions, former employers, and so on. Based on the validation request put forward by the entity, data is selectively fetched about the job candidate and included in the validation request construction or the validation process itself.

Accepting information from disparate information sources can increase the accuracy of the validation process whether the information received confirms or puts into doubt any information being compared for the validation process.

Peer-to-Peer System Validation

Figure 1:
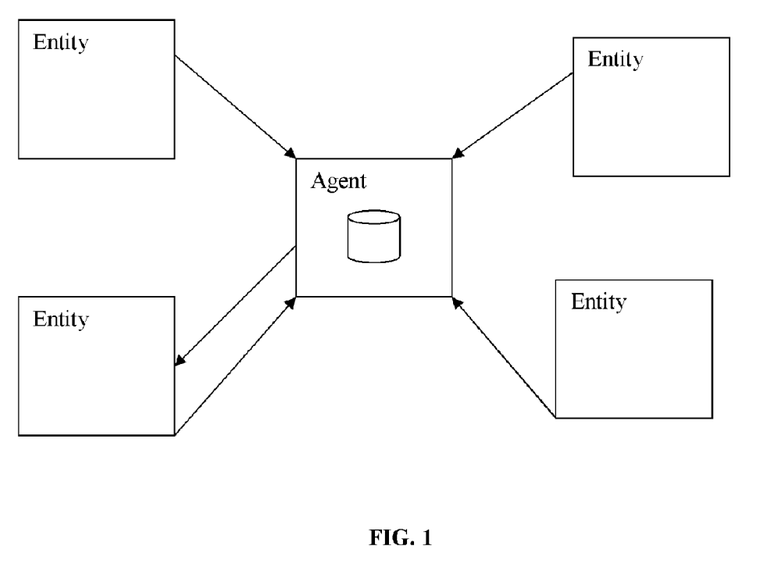
FIG. 1 depicts a peer-to-peer system wherein each entity acts as a conduit for validation information. Being a central database approach to validation requests.

FIG. 1 depicts a peer-to-peer system wherein each entity acts as a conduit for validation information. An entity may have agreed to collaborate with another entity for obtaining confirmatory or otherwise validation information. The other entity in turn might have collaborations with yet other entities for the purpose of validating information. The request for validation from the first entity is accepted by the second entity and it may deal with the request itself or forward all or a portion of the request to another entity thus becoming a requesting entity. Once a response or responses are returned the request outcome can be returned to the originating requesting company.

Based on the different types of validation entities defined above, there could be a number of validation architectures used by the framework.

Agent Validation

Figure 2:
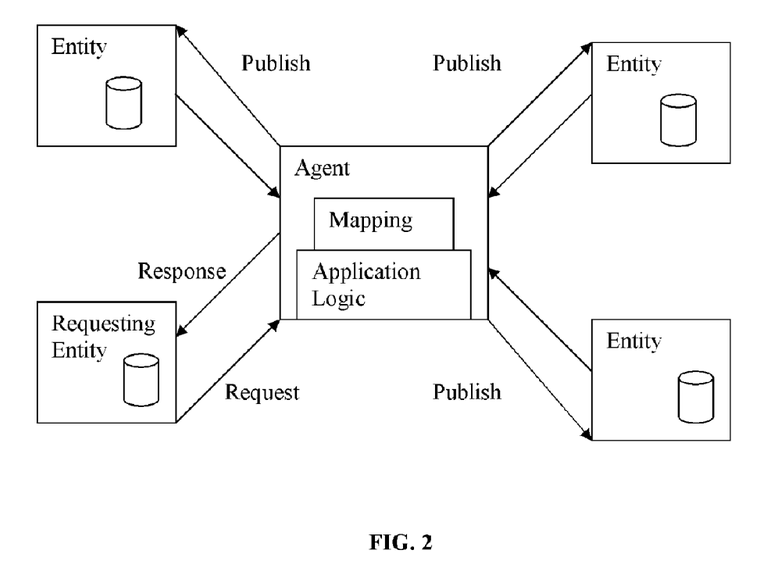
FIG. 2 depicts an entity request response approach according to the invention.

In FIG. 2 the data to be validated is stored in a central database that is managed by an agent. The various inwardly directed arrows indicate data flowing from different entities to the agent's central database. When an entity requests information about another entity, the agent provides the data collected and stored in the central database about the other entity.

In the validation request/response process, the entity requesting information in a validation request sends such a request to the agent. The agent then publishes the validation request to all the member entities in the agent network. All the member entities provide information at their disposal about the entity being validated to the agent who then in turn collates and provides a validation outcome to the requesting entity.

It may also be possible for the agent to act merely as a data gatherer so that the requesting entity can collect sufficient information to generate its own validation outcome base on that received information.

By way of example, the steps associated with the procedures described above in general are provided by way of illustrative screen shots of a software implementation of one embodiment of the invention as depicted in FIGS. 3 to 13. The implementation provides a totally HTML based application.

Figure 3:
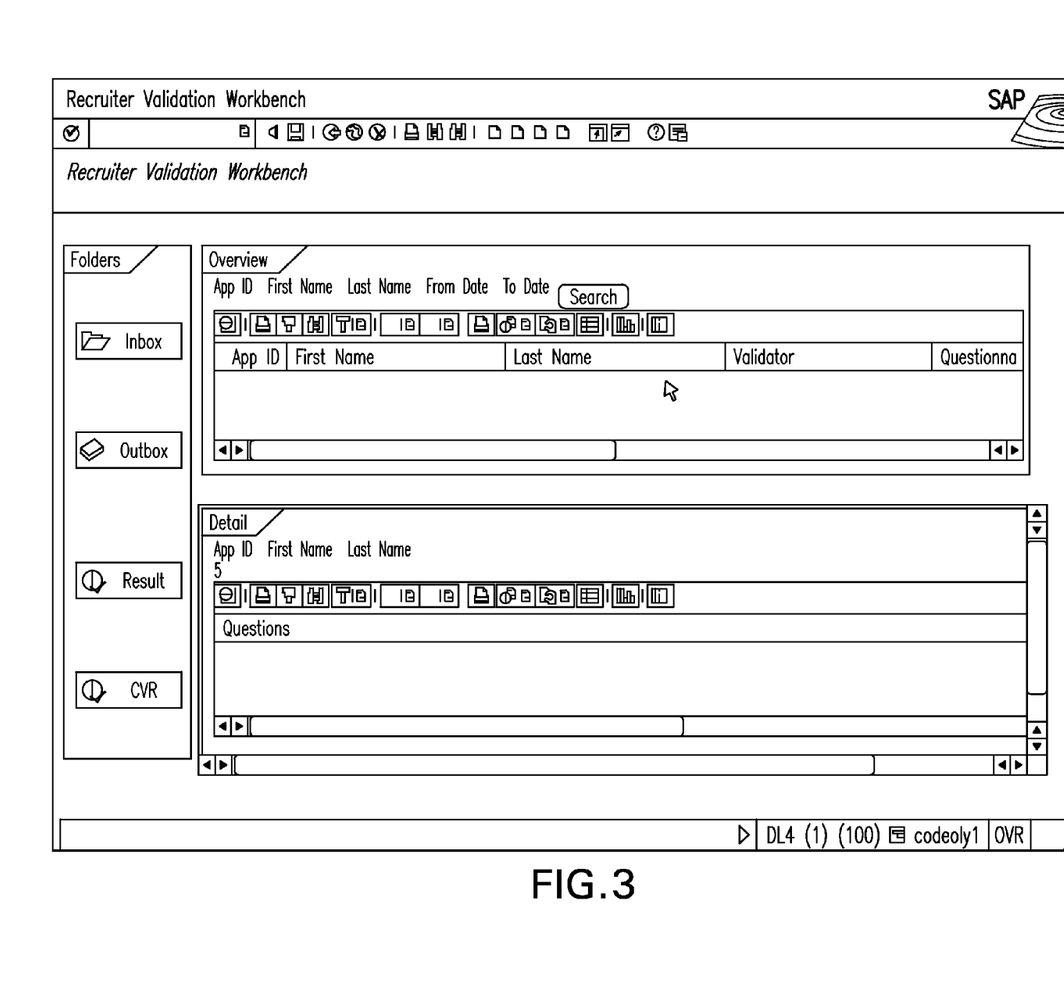
FIG. 3 depicts an employment recruiters' validation workbench screen where a validation request can be raised and sent to a third party validation agency.

FIG. 3 depicts an employment recruiters' validation workbench screen where a validation request can be raised and sent to a third party validation agency, wherein the screen has fields for Applicant ID, First Name, Second Name and various dates associated with the applicant. One of the columns allows for the designation of the validation entity. Another of the columns allows for the setting of questions to be investigated by the validation entity. Overall the screen is presented like an e-mail presentation program with In, Out and Result boxes for dealing with validation requests and validation outcomes, as well as a CVR box for accessing a central data base of validation outcomes and requests. Various other functions are available including a search facility, various visual presentation alternatives, etc.

Figure 4:
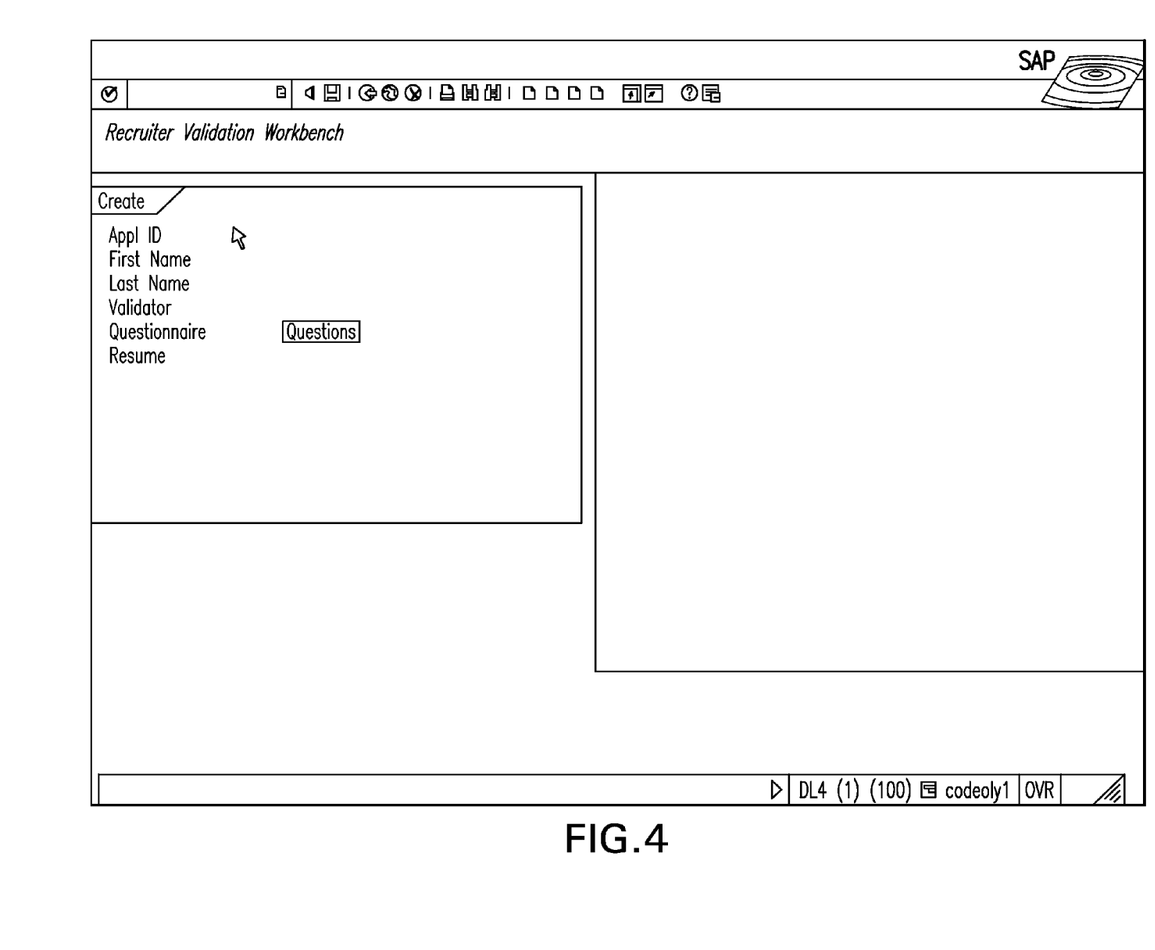
FIG. 4 depicts a validation request raising screen where the applicant id is entered, and the validation agency acronym or ID is entered.

FIG. 4 depicts a validation request raising screen where the applicant ID is entered, and the validation agency acronym or ID is entered and various attachments can be made.

Figure 5:
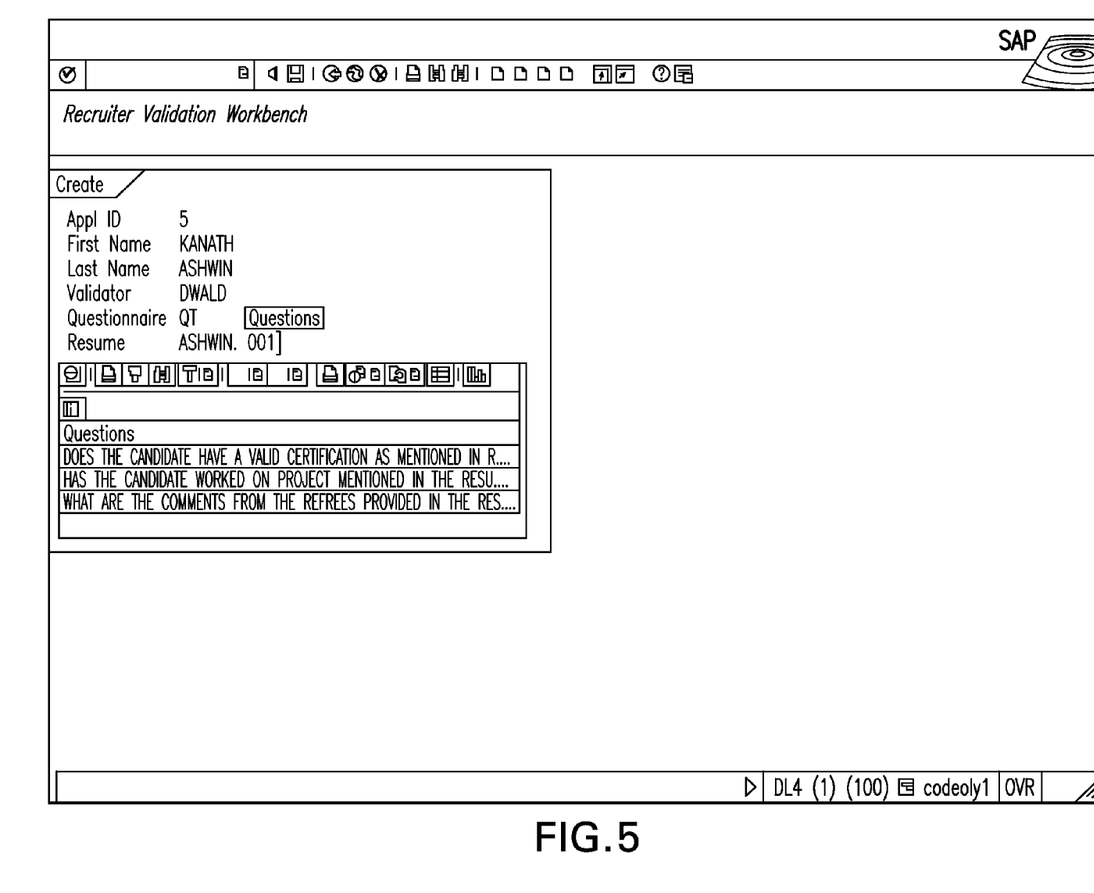
FIG. 5 depicts a screen containing validation criteria, in this example is in the form of a questionnaire.

FIG. 5 depicts a screen containing validation criteria, in this example, being in the form of a questionnaire. The question can be obtained from drop down lists or created by the recruiter. All questions are displayed fro review and modification as required.

Figure 6:
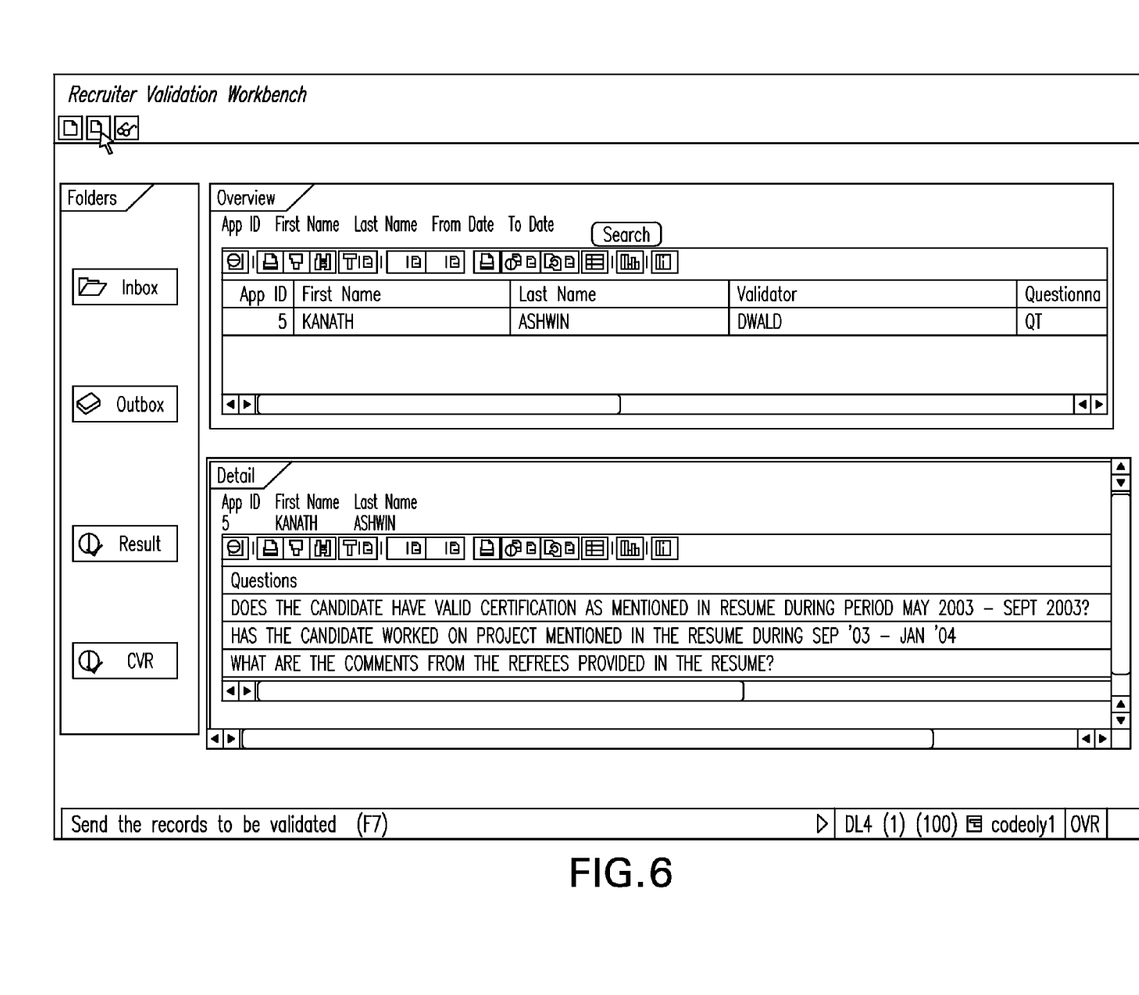
FIG. 6 depicts that once the validation request is created, the XML or IDoc is generated based on a pre-agreed format and sent to the validation entity.

FIG. 6 depicts that once the validation request is created, the XML or IDoc is generated based on a pre-agreed format and sent to the validation entity. The format can be one of many as long as the recruiter and validation entity are agreed on a common format.

Figure 7:
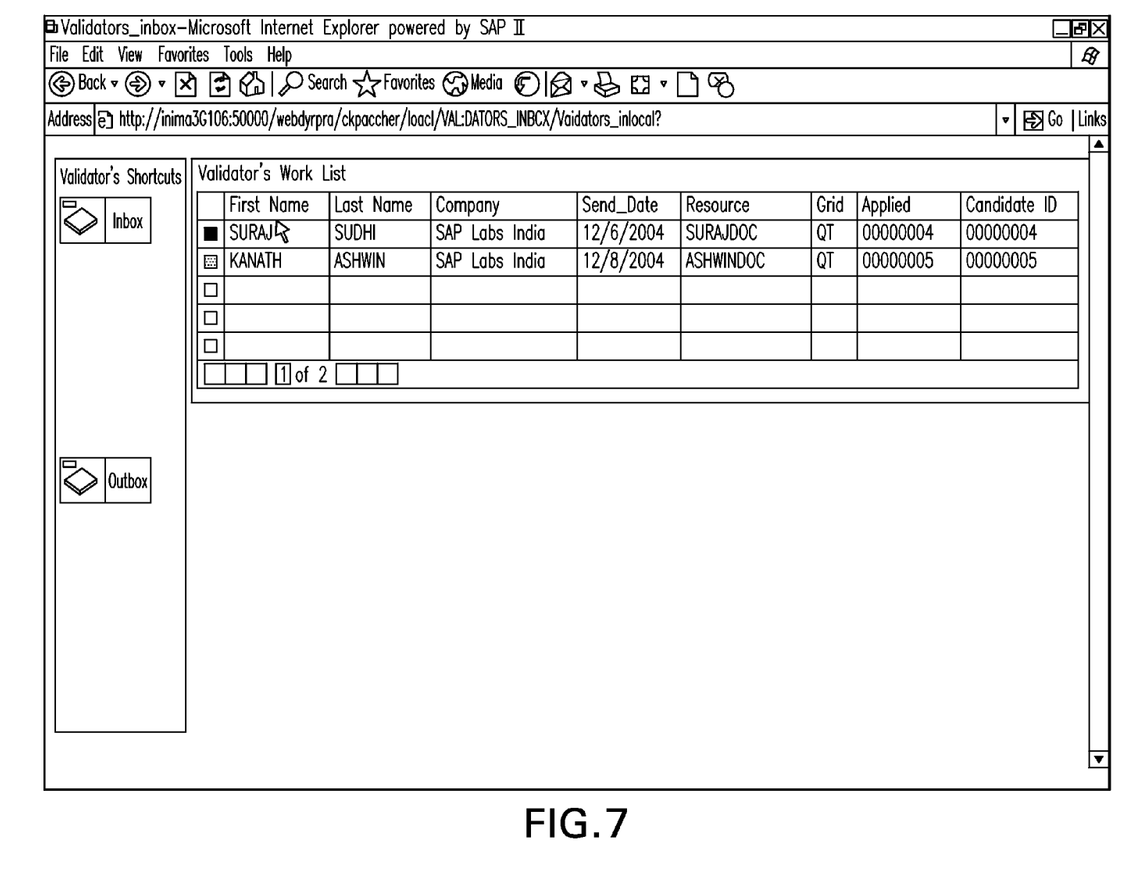
FIG. 7 depicts the screen that the third validation entity sees when it receives the validation request.

FIG. 7 depicts the screen that the third validation entity sees when it receives the validation request.

Figure 8:
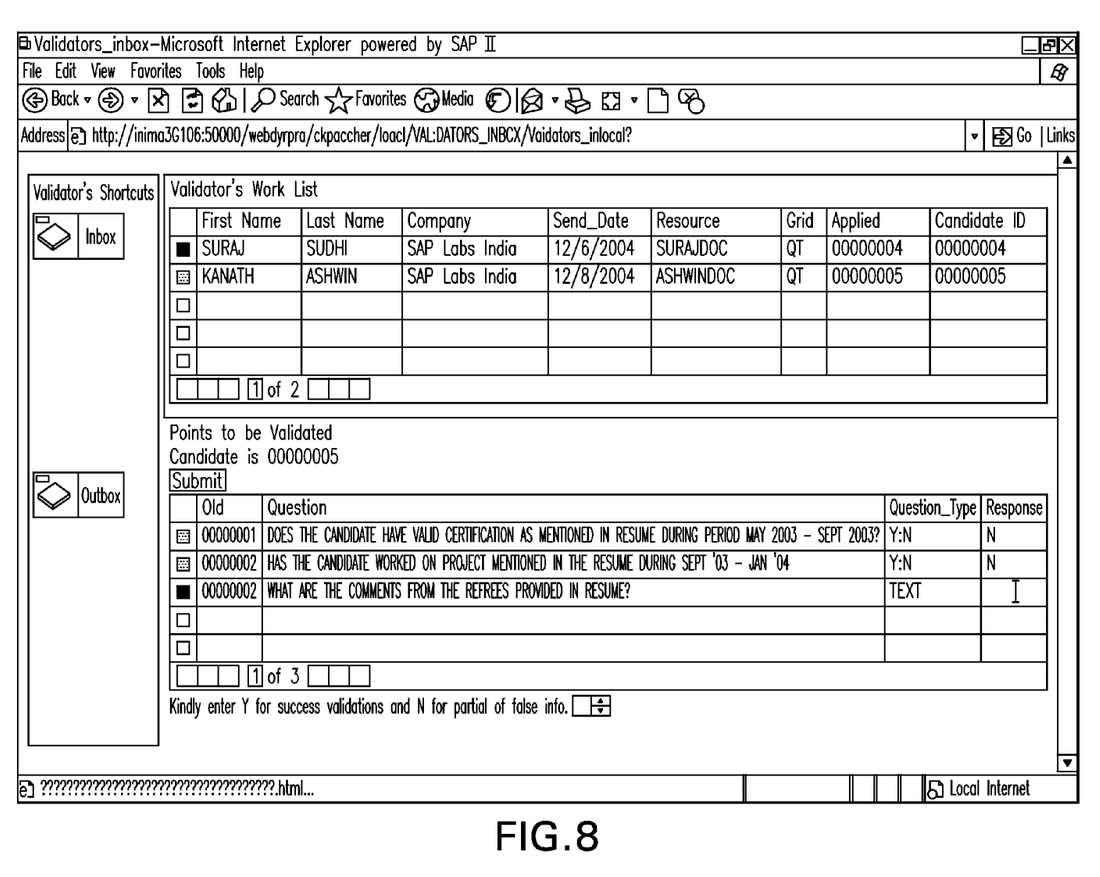
FIG. 8 depicts the list of questions and answers based on the recommendation of the employment recruiter.

FIG. 8 depicts the list of questions and answers based on the recommendation of the employment recruiter.

Figure 9:
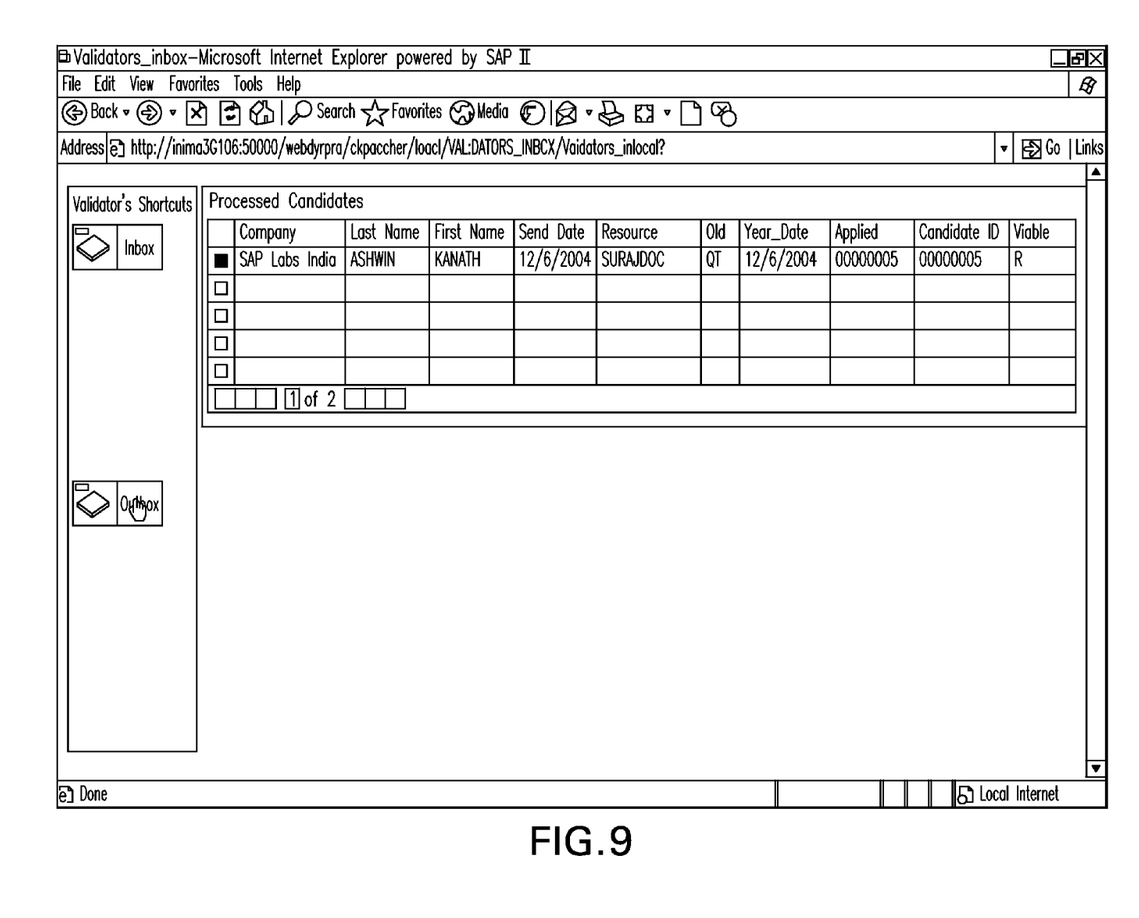
FIG. 9 depicts the posting screen available to the third party validation entity once the validation request is completed.

FIG. 9 depicts the posting screen available to the third party validation entity once the validation request is completed. The validation outcome is ready to be posted and this is achieved by highlighting the outcome and clicking the Outbox as shown pictorially.

Figure 10:
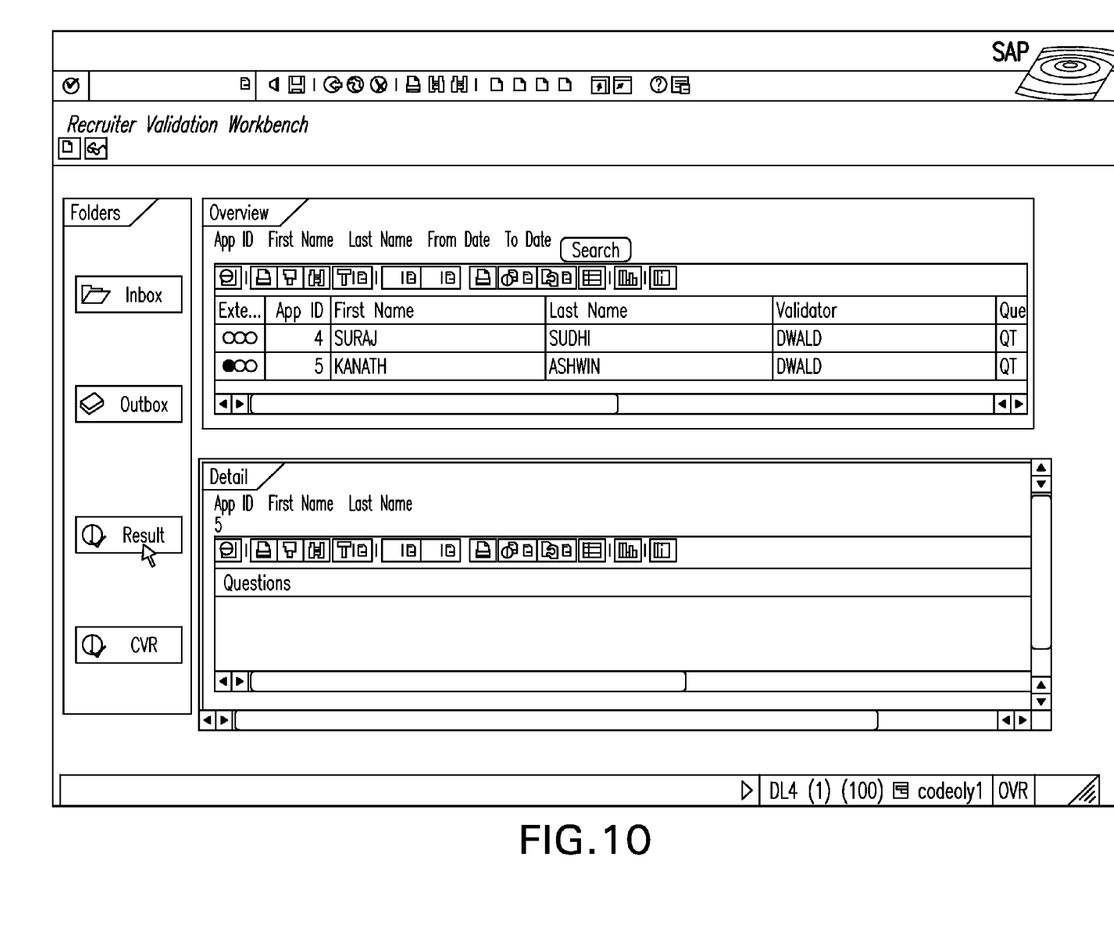
FIG. 10 depicts the screen seen by the employment recruiter of the validation outcome sent by the third party validation entity.

FIG. 10 depicts the screen seen by the employment recruiter of the validation outcome/s sent by the third party validation entity. Two such outcomes are shown for selection by the recruiter. In this example the same validation entity was used for both candidates.

Figure 11:
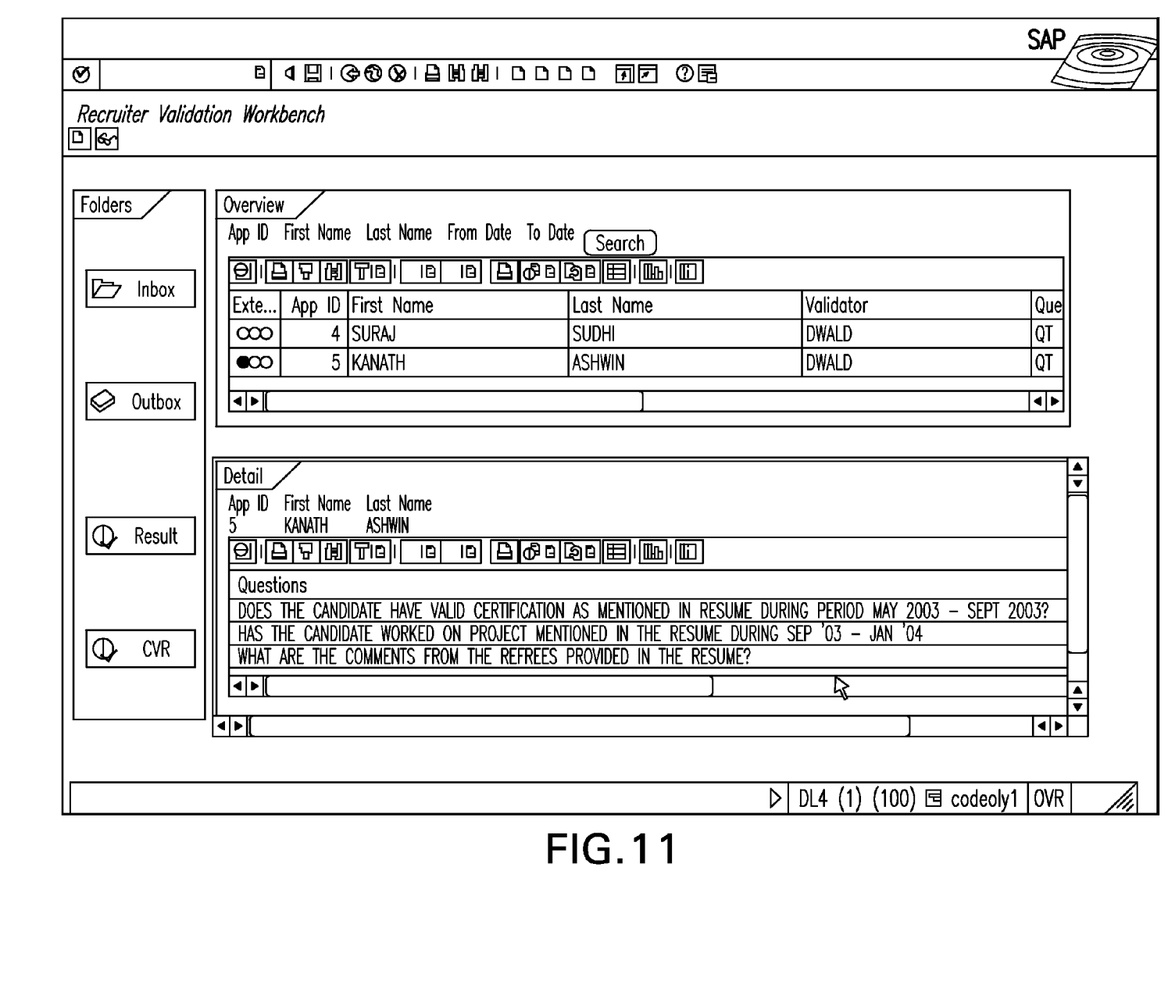
FIG. 11 depicts the screen showing the questions that were dealt with by the validation agent.

FIG. 11 depicts the screen showing the questions that were dealt with by the validation agent. The questions are displayed by clicking an appropriate button on the Detail panel of the screen.

Figure 12:
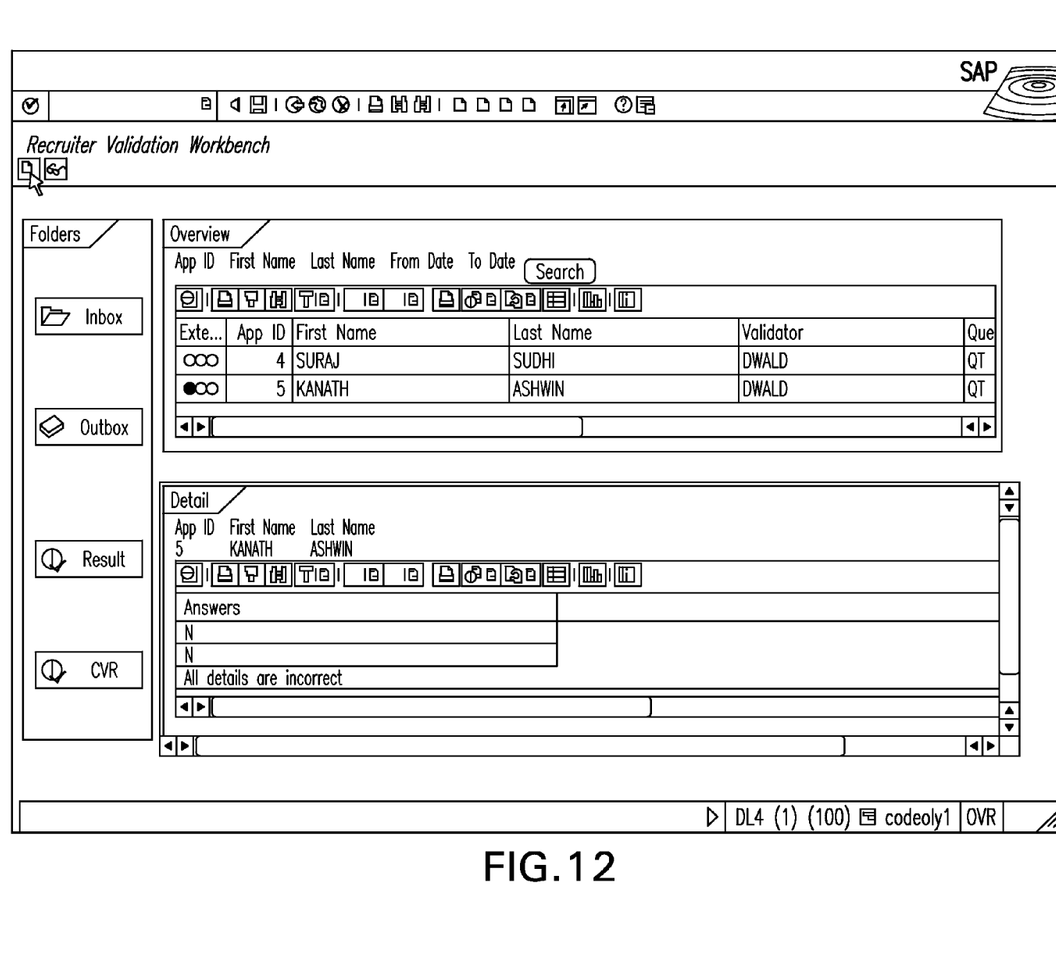
FIG. 12 depicts the screen containing the response to questions and the overall response to validation.

FIG. 12 depicts the screen containing the validation entity's response to questions and the overall response to validation. The answers are displayed by clicking an appropriate button on the Detail panel of the screen.

Figure 13:
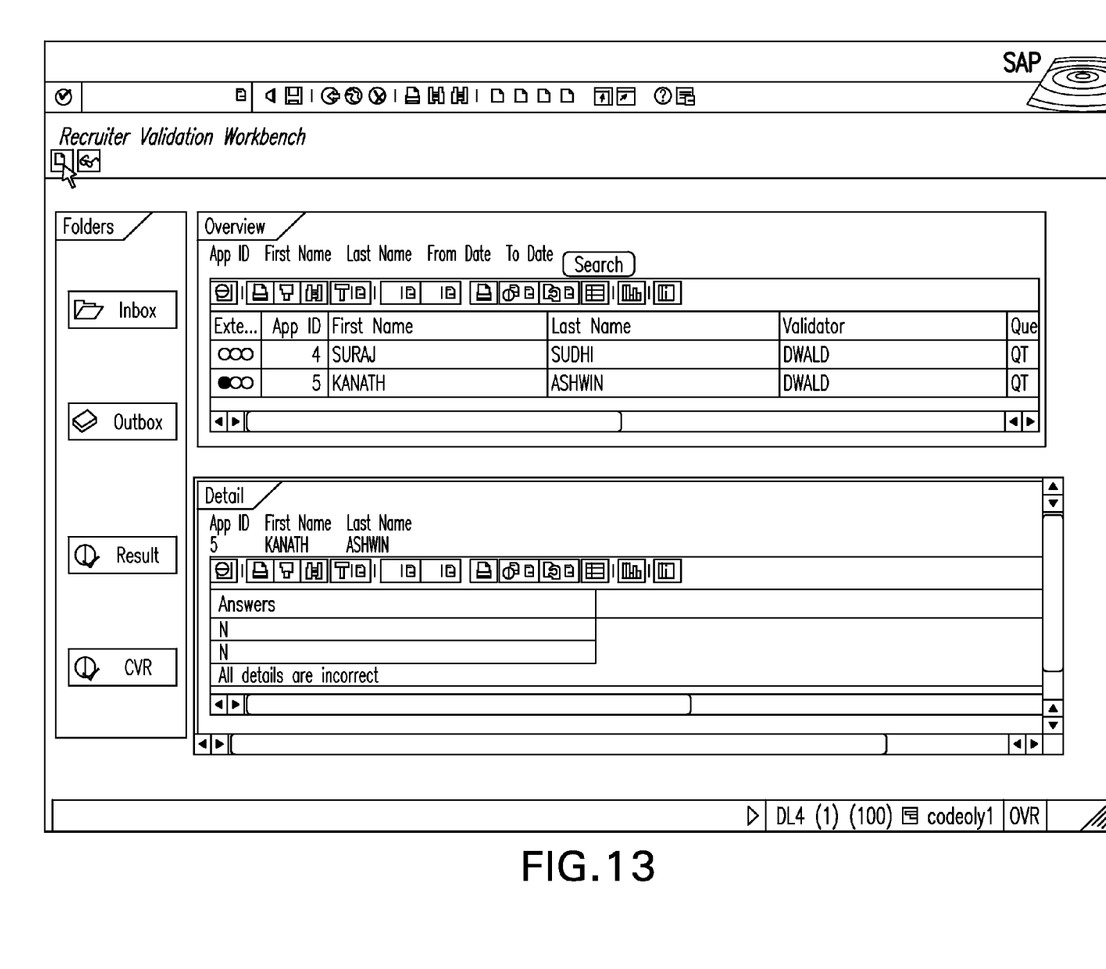
FIG. 13 depicts a screen showing the recruiter posting the results of the validation to a database.

FIG. 13 depicts a screen showing the recruiter posting the results of a validation for candidate ASHWIN to a database. The candidate is selected, as depicted, by the highlighted entry in the Overview panel and the sending is achieved by clicking an appropriate button. A central Validation Request and Outcome database can be set up within the entity generating the requests so that the information is available to selected personnel within the entity or the information may be made available to a more widely accessible database available to two or more entities willing to pool such information. Having a framework for exchanging validation information whether inside an entity or by agreement between entities promotes greater efficiencies in validation efforts for the participating entities.

Figure 14:
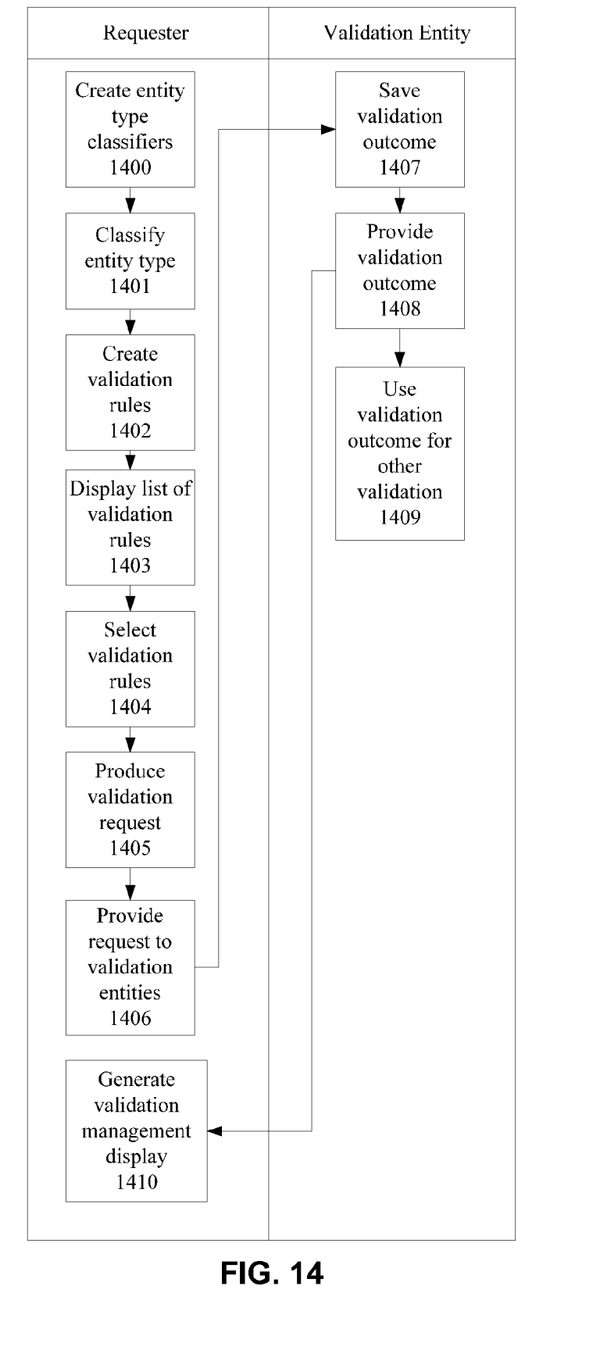
FIG. 14 is a flowchart that shows a validation process according to an example embodiment of the present invention.

Thus, embodiment of the present invention may provide for a method as illustrated in the flowchart of FIG. 14. At step 1400, entity type classifiers may be created. At step 1401, an entity type of an entity to be validated may be classified based on the created classifiers. At step 1402, validation rules may be created. At step 1403, a list of the validation rules, e.g., that are associated with the entity type classification, from which the validation rules are selectable may be displayed. At step 1404, one or more validations rules may be selected. At step 1405, a validation request may be produced. At step 1406, the request may be provided to a validation entity. At step 1407, the validation entity may save a validation outcome. At step 1408, the validation entity may provide the validation outcome to a requester. At step 1409, the validation entity may use the validation outcome to respond to additional validation requests. At step 1410, a validation management display as described herein may be generated. It will be apparent that one or more of the steps may be omitted, and that the precise sequence in which the various steps are shown in FIG. 14 is exemplary and may be changed.

Figure 15:
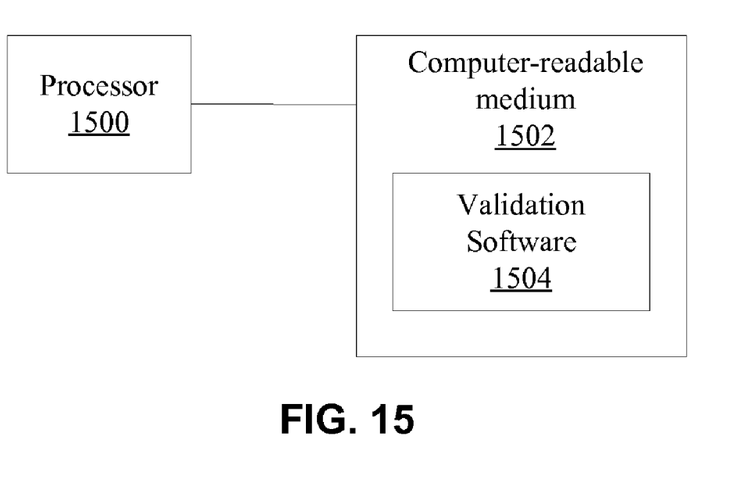
FIG. 15 shows components of a system according to an example embodiment of the present invention.

It should be also appreciated that the present invention can be implemented in numerous ways, including as a process, an apparatus, a system, a computer processor executing software instructions, or a computer readable medium such as a computer readable storage medium or a computer network wherein program instructions are sent over optical or electronic communication links. For example, FIG. 15 shows an example system that includes a processor 1500 in communication with a computer-readable medium 1502 that stores validation software 1504. The validation software 1504 may include instructions executable by the processor 1500, such that, when the processor 1500 executes various portions of the instructions, the instructions cause the processor 1500 to perform the various methods described herein. It should be noted that the order of the steps of disclosed processes may be altered within the scope of the invention, as noted in the appended Claims.

The present invention may be practiced according to the claims without some or all of these specific details. For the purpose of clarity, technical material that is known in the technical fields related to the invention has not been described in detail so that the present invention is not unnecessarily obscured.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers. Further, references to any prior art in this specification is not, and should not be taken as, an acknowledgment or any form of suggestion that such prior art forms part of the common general knowledge.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A computer-implemented method for validating one entity for another entity, comprising:
   classifying an entity type of an entity to be validated based on one or more predefined entity classifiers;
   selecting one or more validation rules based on the classification of the entity;
   producing, by a computer of a requesting entity, a validation request including an identification of the entity to be validated and the selected one or more validation rules;
   providing, by the computer, the validation request to one or more validation entities that perform at least a portion of the validation in accordance with the validation rules;
   providing to the computer of the requesting entity a validation outcome of the validation; and
   generating a validation request management display including an inbox icon, an outbox icon, an overview section, and a details section, wherein:
   responsive to selection of the inbox icon, the overview section displays a list of validation outcomes that have been received and the details section displays detailed information regarding a selected one of the listed validation outcomes; and
   responsive to selection of the outbox icon, the overview section displays a list of validation requests that have been provided to validation entities and the details section displays detailed information regarding a selected one of the listed validation requests.

2. The method according to claim 1, wherein the validation outcome includes one of an indication of positive and an indication of negative.

3. The method according to claim 1, further comprising: creating one or more classifiers for determining an entity type.

4. The method according to claim 1, further comprising: creating one or more validation rules.

5. The method according to claim 1, further comprising: providing, by the one or more validation entities, the validation request to one or more further validation entities other than the one or more validation entities.

6. The method of claim 1, wherein the validation rules include a filter using predetermined criteria.

7. The method of claim 1, wherein the validation rules are applied using a predetermined selection of validation criteria.

8. The method of claim 1, wherein all or a portion of the validation request can be provided from one of the one or more validation entities to another validation entity for complete or partial validation of the request.

9. The method according to claim 1, wherein the validation request includes at least one of (a) a minimum time to respond with at least a portion of the validation outcome and (b) a priority of the validation request.

10. The method of claim 1, wherein the validation request is communicated in an eXtended Mark-up Language.

11. The method of claim 1 wherein a portion of the validation is performed by the requesting entity.

12. The method of claim 1, wherein one of the validation entities includes a central database of validation related information.

13. A system for validating one entity for another entity, including:
   a computer processor programmed to execute:
      software classifying instructions for classification, via the execution of the classifying instructions, of an entity type of an entity to be validated based on one or more predefined entity classifiers;
      software rule instructions for selection, via the execution of the rule instructions, of one or more validation rules based on the classification of the entity;
      software request production instructions for producing a validation request from a requesting entity including an identification of the entity to be validated and the selected one or more validation rules;
      software validation report instructions for providing the validation request to one or more validation entities that perform at least a portion of the validation in accordance with the validation rules;
      software validation instructions for receiving by the requesting entity a validation outcome of the validation; and
      software display generation instructions for generating a validation request management display including an inbox icon, an outbox icon, an overview section, and a details section;

wherein:
responsive to selection of the inbox icon, the overview section displays a list of validation outcomes that have been received and the details section displays detailed information regarding a selected one of the listed validation outcomes; and
responsive to selection of the outbox icon, the overview section displays a list of validation requests that have been provided to validation entities and the details section displays detailed information regarding a selected one of the listed validation requests.

14. The method of claim 1, wherein the validation outcome indicates credentials of the entity to be validated.

15. The method of claim 1, wherein the entity type classification classifies a relationship of the entity to be validated to the requesting entity.

16. The method of claim 1, further comprising:
providing a display including a list of selectable validation rules associated with the entity type classification from which the one or validation rules are selected.

17. The method according to claim 1, further comprising:
saving, by the one or more validation entities, the validation outcome; and
subsequent to the computer receiving the validation outcome, the one or more validation entities using the saved validation outcome to respond to subsequent validation requests.

18. The method of claim 1, wherein the displayed detailed information regarding the selected one of the listed validation outcomes includes questions answered by the one or more validation entities when a first view button of the details section is selected and includes answers to the questions when a second view button of the details section is selected.

19. The method of claim 18, wherein, when the second view button is selected, the displayed detailed information further includes an overall validation result.

20. The method of claim 1, wherein the validation request management display further includes a publishing icon, responsive to selection of which, a selected one of the validation outcomes displayed in the overview section is added to a central repository for access of the validation outcomes by other validation requesting entities.

21. The method of claim 5, wherein the one or more validation entities perform the at least the portion of the validation based on responses to the validation request received from the further validation entities.

22. The method of claim 1, wherein the classification is received by the computer as user input.

23. The method of claim 1, wherein the classification is performed by the computer.

24. A tangibly embodied computer-readable medium having stored thereon instructions, which, when executed, cause a processor to perform a method for validating one entity for another entity, the method comprising:
classifying an entity type of an entity to be validated based on one or more predefined entity classifiers;
selecting one or more validation rules based on the classification of the entity;
producing, by a computer of a requesting entity, a validation request including an identification of the entity to be validated and the selected one or more validation rules;
providing, by the computer, the validation request to one or more validation entities that perform at least a portion of the validation in accordance with the validation rules;
receiving by the computer of the requesting entity a validation outcome of the validation; and
generating a validation request management display including an inbox icon, an outbox icon, an overview section, and a details section, wherein:
responsive to selection of the inbox icon, the overview section displays a list of validation outcomes that have been received and the details section displays detailed information regarding a selected one of the listed validation outcomes; and
responsive to selection of the outbox icon, the overview section displays a list of validation requests that have been provided to validation entities and the details section displays detailed information regarding a selected one of the listed validation requests.

* * * * *